United States Patent Office 3,369,051
Patented Feb. 13, 1968

3,369,051
1-METHYLCYCLOHEXENE PROCESS
Louis L. Ferstandig, El Cerrito, Calif., assignor to Chevron Research Company, a corporation of Delaware
No Drawing. Continuation of application Ser. No. 358,087, Apr. 7, 1964. This application Aug. 1, 1966, Ser. No. 570,135
5 Claims. (Cl. 260—666)

ABSTRACT OF THE DISCLOSURE 1-methylcyclohexene is produced by heating cis-1,2-dimethylcyclohexane in the vapor phase at a temperature in the range 1000–1400° F. and at a moderate conversion level, e.g., less than about 25 percent per pass.

---

This application is a continuation of application Ser. No. 358,087, filed Apr. 7, 1964, now abandoned.

This invention relates to a process for the production of 1-methylcyclohexene. More particularly, it relates to the production of 1-methylcyclohexene by a thermal elimination of methane from cis-1,2-dimethylcyclohexane.

1-methylcyclohexene is an especially desirable chemical raw material because from it such organic intermediates useful in the polymer art as glutaric acid, adipic acid, 1-methylcyclohexene epoxide, 6-hydroxyheptanoic acid and the like are readily derivable.

In accordance with the present process, gaseous cis-1,2-dimethylcyclohexane is introduced into a reaction zone maintained at thermal methane eliminating conditions, and the resulting effluent reaction product mixture containing 1-methylcyclohexene is recovered.

By thermal methane eliminating conditions is meant a reaction zone temperature in the range from about 900–1740° F., preferably from about 1000° to 1400° F., into which feed is introduced at a liquid hourly space velocity in the range 0.1 to 6000, preferably in the range 0.5 to 1000.

In a preferred embodiment of the present process, gaseous cis-1,2-dimethylcyclohexane is introduced at a liquid hourly spaced velocity of 1.3 into a reaction zone maintained at about 1120° F. Under this preferred condition, a 37% yield of 1-methylcyclohexene is obtained.

Example 1

Into a reaction zone maintained at 1120° F., vaporous cis-1,2-dimethylcyclohexane was passed at a 1.3 liquid hourly spaced velocity. The cooled and liquified reaction zone effluent was found to correspond to an 11% conversion and a 37% yield of 1-methylcyclohexene based upon feed converted.

Example 2

When trans-1,2-dimethylcyclohexane is submitted to thermal demethanation conditions as in Example 1, no appreciable amount of 1-methylcyclohexene is produced.

Example 3

When 1,4-dimethylcyclohexane and 1,3-dimethylcyclohexane were substituted for 1,2-dimethylcyclohexene as in Example 1, no detectable methylcyclohexene product is obtained.

Below about 900° F., little or no thermal demethanation results. Above about 1400° F., feed degradation to undesirable by-product is excessive.

In general, liquid hourly spaced velocities corresponding to 5–25% conversion per pass are preferred, i.e., LHSV's in the range 0.5 to 1000, with the higher values being desirably employed at the higher temperatures.

The use of inert diluents such as steam, nitrogen, carbon dioxide and the like are desirably used to facilitate adjusting feed rates, feed introduction into the reaction zone and the like.

Desirably, the recovered 1-methylcyclohexene-containing reaction product mixture is passed to a fractionator from which the 1-methylcyclohexene is recovered as an overhead fraction, and the unconverted cis-1,2-dimethylcyclohexane is recovered as a bottoms fraction which is recycled to the reaction zone. Where a cis-, trans-1,2-dimethylcyclohexane feed mixture is employed, provision for rejection of accumulated trans-1,2-dimethylcyclohexane is desirable.

I claim:
1. Process for the production of 1-methylcyclohexene by the thermal elimination of methane from cis-1,2-dimethylcyclohexane which comprises introducing a feed consisting essentially of gaseous cis-1,2-dimethylcyclohexane at a liquid hourly spaced velocity in the range from about 0.1 to 6000 into a reaction zone maintained at a temperature in the range from about 1000° F. to 1400° F. and wherein the conversion per pass of said feed is maintained in the range from about 5 to 25 percent and recovering a substantial yield of 1-methylcyclohexene from the resulting reaction product mixture.

2. Process of claim 1 wherein the liquid hourly space velocity is in the range from about 0.5 to 1000.

3. The process of claim 1 wherein an inert diluent gas is employed to facilitate the process.

4. The process of claim 1 wherein said reaction product mixture is fractionally distilled and the separated cis-1,2-dimethylcyclohexane is recycled to said reaction zone.

5. Process for the production of 1-methylcyclohexene by the thermal elimination of methane from cis-1,2-dimethylcyclohexane which comprises introducing a feed consisting essentially of a mixture of cis- and trans-1,2-dimethylcyclohexane at a liquid hourly space velocity in the range from about 0.1 to 6000 into a reaction zone maintained at a temperature in the range from about 1000° F. to 1400° F. and wherein the conversion per pass of said feed is maintained in the range from about 5 to 25 percent and recovering a substantial yield of 1-methylcyclohexene from the resulting reaction product mixture.

References Cited

Chem. Ab. 29:2152[5] (N. D. Zelinskii et al., J. Gen. Chem., U.S.S.R. 4, 856–65; Compt. Rend. Acad. Sci., U.S.S.R. 4, pages 208–12, 1934).

Chem. Ab. 30:4472[6] (YuA. Arbizov et al., Compt. Rend. Acad. Sci., U.S.S.R. (N.S.) 4, pages 337–40, 1935).

Chem. Ab., vol. 53:16517h (S. D. Mekhtiev et al., Doklady Akad. Nauk Azerbaighan S.S.R. 15, No. 2, 125–8 Russian summary) (28–9, 1959).

Chem. Ab. 55:8318a (S. D. Mekhtiev et al., Azert. Khim. Zh. (1959), No. 3, 3–13).

Chem. Ab. 58:8836d (S. D. Mekhtiev et al., Azert. Khim Zh., 1959, No. 4, pages 59–70).

Chem. Ab., vol. 58:11143g (S. D. Mekhtiev et al., Azerbaizhan Khim. Zh., 1959, No. 5, pages 13–20).

DELBERT E. GANTZ, *Primary Examiner.*

V. O'KEEFE, *Assistant Examiner.*